United States Patent
Wakahara

(10) Patent No.: US 10,082,386 B2
(45) Date of Patent: Sep. 25, 2018

(54) STRAIN SENSOR AND MANUFACTURING METHOD FOR STRAIN SENSOR

(71) Applicant: CMIWS CO., LTD., Kyoto (JP)

(72) Inventor: Masahito Wakahara, Kyoto (JP)

(73) Assignee: CMIWS CO., LTD., Kyoto (JP)

( * ) Notice: Subject to any disclaimer, the term of this patent is extended or adjusted under 35 U.S.C. 154(b) by 392 days.

(21) Appl. No.: 14/890,327

(22) PCT Filed: Nov. 27, 2014

(86) PCT No.: PCT/JP2014/081445
§ 371 (c)(1),
(2) Date: Nov. 10, 2015

(87) PCT Pub. No.: WO2015/080222
PCT Pub. Date: Jun. 4, 2015

(65) Prior Publication Data
US 2016/0138909 A1    May 19, 2016

(30) Foreign Application Priority Data
Dec. 1, 2013  (JP) .................................. 2013-248786

(51) Int. Cl.
*G01B 11/16*  (2006.01)
*G01D 5/353*  (2006.01)

(52) U.S. Cl.
CPC ............ *G01B 11/165* (2013.01); *G01B 11/18* (2013.01); *G01D 5/353* (2013.01)

(58) Field of Classification Search
CPC ....... G01B 11/18; G01B 11/165; G01B 11/16; G01L 1/246; G01L 1/242; G02B 6/02209;
(Continued)

(56) References Cited

U.S. PATENT DOCUMENTS 4,972,073 A    11/1990  Lessing
6,586,722 B1 *  7/2003  Kenny ................... G01L 1/246
                                              250/227.16
(Continued)

FOREIGN PATENT DOCUMENTS

JP    H11-513806 A    11/1999
JP    2001-281462 A   10/2001
(Continued)

OTHER PUBLICATIONS

The extended European search report issued by the European Patent Office dated May 18, 2016, which corresponds to European Patent Application No. 14866716.5-1568 and is related to U.S. Appl. No. 14/890,327.

(Continued)

*Primary Examiner* — Freddie Kirkland, III
(74) *Attorney, Agent, or Firm* — Studebaker & Brackett PC

(57) ABSTRACT

In a strain sensor and a method for manufacturing a strain sensor according to the present invention, a plurality of supports is provided in a base in a state of protruding. An optical fiber is wound around the supports. The optical fiber is provided in a state of having parts directing to different directions each other between the supports. Fixing materials fix the optical fiber to the supports in a state in which tension is applied to fiber parts between the supports.

18 Claims, 15 Drawing Sheets

(58) Field of Classification Search
CPC .... G02B 6/3608; G02B 6/4477; G02B 6/022;
G02B 6/3628; G02B 6/3636; G01D 5/26;
G01D 5/353; G01D 5/35316
See application file for complete search history.

(56) References Cited

U.S. PATENT DOCUMENTS

| | | | | |
|---|---|---|---|---|
| 8,701,500 | B2 * | 4/2014 | Swinehart | G02B 6/02209 73/800 |
| 9,081,165 | B2 * | 7/2015 | Swinehart | G02B 6/02209 |
| 9,248,615 | B2 * | 2/2016 | Swinehart | B29D 11/00663 |
| 9,857,250 | B2 * | 1/2018 | Wakahara | G01L 1/246 |
| 2007/0193362 | A1 | 8/2007 | Ferguson | |

FOREIGN PATENT DOCUMENTS

| | | |
|---|---|---|
| JP | 2002-062120 A | 2/2002 |
| JP | 2006-126041 A | 5/2006 |
| JP | 2007-212460 A | 8/2007 |
| JP | 2008-224635 A | 9/2008 |
| JP | 2011-080923 A | 4/2011 |
| WO | 97/15805 A1 | 5/1997 |
| WO | 00/28294 A1 | 5/2000 |

OTHER PUBLICATIONS

Notification Concerning Transmittal of International Preliminary Report on Patentability (Chapter I) and Translation of Written Opinion of the International Searching Authority; PCT/JP2014/081445 dated Jun. 16, 2016.

International Search Report issued in PCT/JP2014/081445, dated Feb. 24, 2015.

Written Opinion issued in PCT/JP2014/081445, dated Feb. 24, 2015.

* cited by examiner (a)

(b)

(a)

(b)

(a)

(b)

(a)

(b)

(c)

(d)

(a)

(b)

STRAIN SENSOR AND MANUFACTURING METHOD FOR STRAIN SENSOR

TECHNICAL FIELD

The present invention relates to a strain sensor and a method for manufacturing a strain sensor, and in particular to a strain sensor provided with an optical fiber optically detecting strain of a structure to be measured and a method for manufacturing such a strain sensor.

BACKGROUND ART

Conventionally, strain sensors have been extensively used for structures like buildings, bridges, and tunnels, means of transportation like aircrafts, ships and trains, detecting distortions and displacement of the ground. A strain sensor provided with a resistor has been known. The strain sensor of this kind obtains strain amount on the basis of changes of electric resistance of the resistor caused by deformation. When strain is measured at many points, as an object area to be measured extends a wide area, many strain sensors are arranged on a surface of a measuring object and changes of the electric resistance of each of the sensors are measured. In this case, in each of the strain sensors wires are installed so as to measure the electric resistance and electrical power is needed to be supplied through the wire.

According to the above-described electric strain sensor, very little changes of the electric resistance must be detected and a countermeasure against electric noise is required in order to secure measurement accuracy. Further, a life of the electric strain sensor is short due to aging of the resistor, the wire and contacts thereof and there is a risk of damages by lighting.

Accordingly, a strain sensor provided with an optical fiber has been used in recent years (for example, refer to patent documents 1, 2 and the like). The strain sensor of this kind obtains strain amount on the basis of changes of reflected light and scattering light which are transmitted through the optical fiber in response to deformations of the optical fiber. Such a strain sensor does not need a supply of the electrical power and results of measurement by the strain sensor are less affected by the electric noise. Further, such a strain sensor is less aged and is less damaged by lighting since there is no need for wiring in each of the strain sensors. Therefore, it is characterized that the strain sensor has superior long-term reliability. In addition, the optical fiber itself serves as both a sensor and a signal transmission line so that signals can be transmitted over long distance. Thus, strain of an object over several kilometers can be measured by connecting a measurement instrument at one end of the optical fiber.

For example, in the patent document 1 as shown below, a strain sensor (a strain gage) measuring strain amount in an axis direction of an optical fiber linearly arranged on a carrier is disclosed.

In the patent document 2, a rosette strain sensor measuring strain amount and strain directions is disclosed. In the rosette strain sensor, single-axis strain sensors as disclosed in the patent document 1 are arranged in different directions on the same surface or on a surface parallel to each sensor. The rosette strain sensor obtains two-dimensional strain (the strain amount and the strain directions) generated on a surface of a measuring object on the basis of the strain amount measured by each strain sensor. According to the patent document 2, such rosette strain sensor is realized by an optical fiber containing fiber Bragg gratings (FBGs) which have different Bragg wavelengths and are connected in series. In this configuration, each FBG is arranged so as to direct to different directions respectively by bending the optical fiber. Then, forming narrow portions in bended portions in the optical fiber can lead to realization of reduction of reflection loss and miniaturization of the rosette strain sensor.

CITATION LIST

Patent Documents

Patent document 1: Japanese Unexamined Patent Application Publication No. 2007-212460
Patent document 2: WO00/28294

SUMMARY OF INVENTION

Problems to be Solved by Invention

According to a configuration disclosed in the patent document 2, for example, the strain sensor can be miniaturized in comparison with a configuration in which single-axis strain sensors having different Bragg wavelengths are arranged so as to direct to different three directions. Also, the rosette strain sensor disclosed in the patent document 2 is easier to be fixed to a measuring object than the single-axis strain sensors directing to three directions attached by spot welding and the like at positions adjacent to each other on a surface of the measuring object.

Incidentally, in the optical strain sensor containing the optical fiber, the optical fiber is fixed in a state in which tension is applied. The strain sensor can measure the stress in a compressive direction as well as in a tensile direction by applying the tension to the optical fiber. In the rosette sensor the equal tension is preferably applied to each optical fiber directing to different directions. As a result, for example, in each part of the optical fiber degree of deformation becomes equal when equal stress (especially compressive stress) works to an axis direction of the optical fiber, thereby measurement accuracy of the strain can be enhanced.

In the configuration disclosed by the patent document 2, however, the FBG parts of the optical fiber are sealed by resin (rigid material) made of epoxy resin and the like. In such a configuration, even though each FBG part can be sealed in a state in which the tension is applied to each FBG part, it is extremely difficult to equalize the tension applied to each FBG part. Accordingly, measurement accuracy of the strain cannot be improved.

Further, the optical fiber is sealed by resin so that it is anticipated that the optical fiber and the resin may be partially peeled (separated) due to aging. Accordingly, securing long-term reliability is difficult.

In addition, according to the configuration employing resin sealing, when a surface of a measuring object is metal, metal is to be coupled with resin. Even though rigid material is used for resin, rigidity thereof is weaker than that of metal because of being resin. Therefore, strain is absorbed in resin so that the strain on the surface of the measuring object may not be transmitted to the optical fiber accurately. Also, as coefficient of thermal expansion of resin differs from that of metal, it is anticipated that the sealed resin has unequal degree of strain with the measuring object depending on temperature.

As described above, the disclosed art in the patent document 2 cannot be sufficiently satisfied.

The present invention is attempted in view of such conventional art and the purpose of the present invention is to provide a strain sensor which can measure strain amount and strain directions on a surface of a measuring object more accurately than those of the conventional art and a method for manufacturing such a strain sensor.

Solution to Problem

The present invention employs following technical means in order to attain the above-described purpose. A strain sensor according to the present invention is provided with a base, a plurality of supports, an optical fiber and fixing materials. A plurality of the supports is formed in a state of protruding on the base and the optical fiber is wound around. The optical fiber is provided in a state in which the optical fiber has parts directing to different directions each other between the supports as viewed from an opposite direction to the base. Herein, the parts directing to the different directions each other between the supports can be constituted by changing directions of one optical fiber. Also, the parts directing to the different directions each other between the supports can be constituted by a plurality of respectively independent optical fibers. The fixing materials fix the optical fiber to the supports in a state in which tension is applied to the parts between the supports.

In addition, another strain sensor according to the present invention is provided with a base, a plurality of supports, an optical fiber, fixing materials and wound member arranging areas. A plurality of the supports is formed in a state of protruding on the base. The optical fiber is provided in a state in which the optical fiber has parts directing to different directions each other between the supports as viewed from an opposite direction to the base. Herein, the parts directing to the different directions each other between supports can be constituted by changing directions of one optical fiber. Also, the parts directing to the different directions each other between supports can be constituted by a plurality of respectively independent optical fibers. The fixing materials fix the optical fiber to the supports in a state in which tension is applied to the parts between the supports. The wound member arranging areas are formed adjacent to the supports and wound members around which the optical fiber is wound is temporarily arranged therein when the above-described tension is applied.

According to the strain sensor of the present invention, the optical fiber is wound around the supports so that tension (pretension) can be applied thereto and the optical fiber is fixed to the support in such a state. Therefore, the tension can be relatively easily applied to the optical fiber. In a configuration employing one optical fiber, the optical fiber is wound around the support so that uniform tension can be extremely easily applied to each part of the optical fiber. Further, as a resin sealing is not employed like the conventional configuration, fixed portions of the optical fiber is hard to be peeled so that long-term reliability can be secured. In addition, any material not limiting to resin but metal and the like can be used for the base and the supports. For example, conforming to material of a surface of a measuring object, a material having an equal degree of coefficient of thermal expansion or a relatively close coefficient of thermal expansion can be employed in the base. Accordingly, the strain on the surface of the measuring object can be accurately detected.

In the above-described strain sensor, the supports can be arranged in a state of rotational symmetry as viewed from an opposite direction to the base. In such a case, the optical fiber can be arranged in a state of passing adjacent to points of symmetry (rotation centers) of the supports. Also, the optical fiber can be arranged in a state of enveloping outer edges of the supports as viewed from the opposite direction to the base.

In the above-described configuration, the strain can be detected by measuring variations of back scattering light in the optical fiber. Also, the strain can be detected by measuring reflected light in a reflector installed in the optical fiber. For example, in the above-described configuration, a configuration in which the optical fiber has FBGs (fiber Bragg gratings) in the parts directing to different directions each other between distributed supports can be employed.

Further, in the above-described configuration, a configuration in which the base is provided with a plurality of island-shaped members having the support respectively and a connection separably connecting each of the island-shaped members can be employed. In this configuration, after the base is fixed to the measuring object, the base is separated into each of the island-shaped members so that each of the supports (each island-shaped member containing each support) becomes independent and is not affected by other supports. Therefore, for example, this configuration can restrain the stress from concentrating in a specific portion of the base when large strain is occurred in the measuring object, and can restrain an occurrence of different strain from strain of the measuring object resulting from a difference of coefficient of expansion between the measuring object and the base. As a result, in comparison with the conventional configuration, a range of measurable strain amount can be expanded. Also, the connection may be constituted as a unified member with the island-shaped members or as a separated member from the island-shaped members. In the latter configuration, a configuration in which the connection has a spacer to hold an interval between the island-shaped members at a predetermined interval can be employed.

On the other hand, in another aspect, the present invention can provide a method for manufacturing a strain sensor. That is, in the method for manufacturing the strain sensor according to the present invention, firstly, wound members are arranged so as to be adjacent to each of a plurality of supports provided in a state of protruding on a base. Next, an optical fiber is wound around portions constituted by the wound members and the supports or the wound members. At that time, the optical fiber is arranged in a state of having parts directing to different directions between the supports each other as viewed from an opposite direction to the base. After that, the optical fiber is fixed to the supports in a state in which tension is applied to the parts between the supports. Then, after the optical fiber is fixed to the supports, the wound members are released.

Effects of Invention

According to the present invention, strain amount and strain directions can be measured more accurately than the conventional art.

DESCRIPTION OF EMBODIMENTS

Embodiments of the present invention are described in detail hereafter with reference to the drawings. The present invention is embodied as a rosette strain sensor containing optical fiber directing to three directions of 0 degrees, 60 degrees and 120 degrees.

Figure 1:
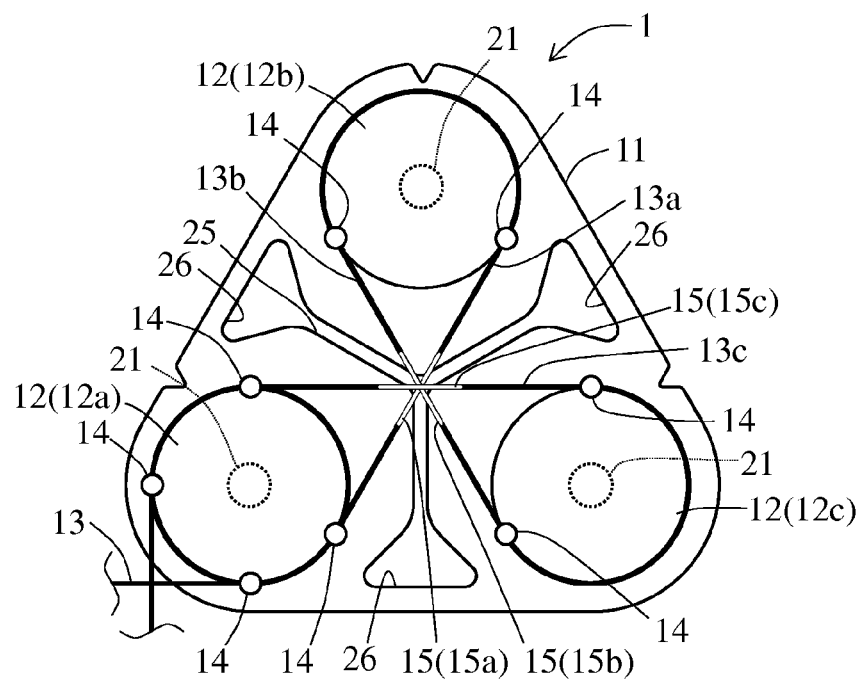
FIGS. 1 (*a*) and (*b*) are schematic structural views showing an example of the strain sensor in accordance with an embodiment of the present invention.
Figure 1:
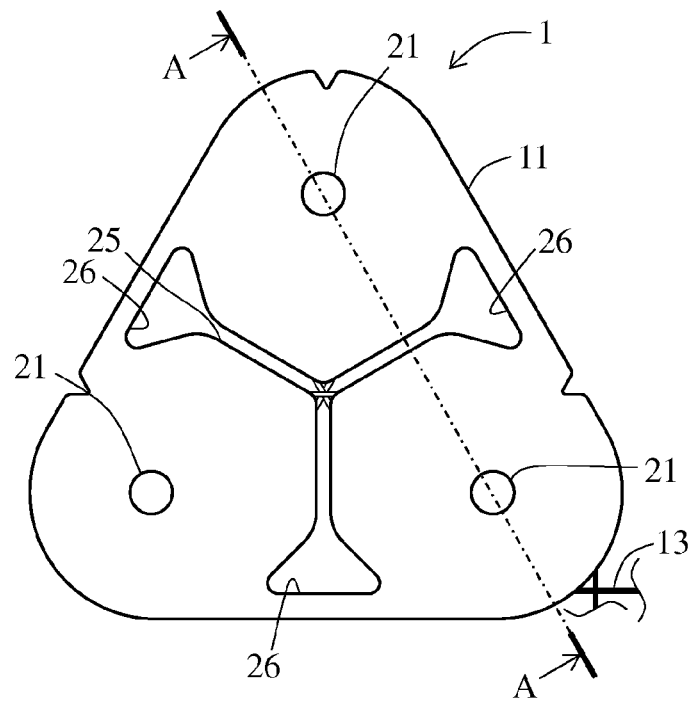
Figure 2:
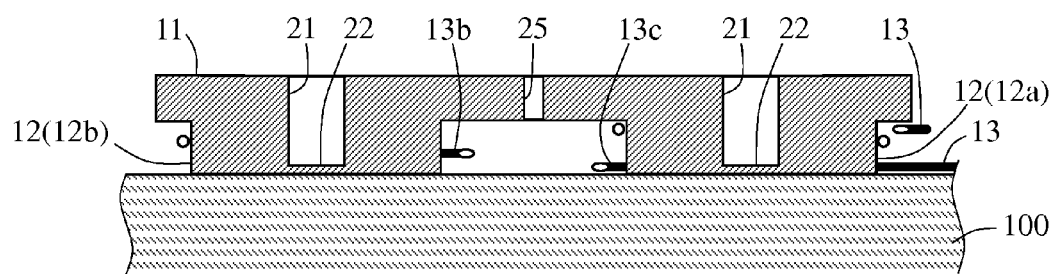
FIG. 2 is a schematic cross-sectional view showing an example of the strain sensor in accordance with an embodiment of the present invention.

FIG. 1 (a) and FIG. 1 (b) are schematic structural views showing a whole configuration of a strain sensor in accordance with an embodiment. FIG. 1 (a) shows a surface on which a surface of a measuring object is fixed and FIG. 1 (b) shows an opposite surface of the FIG. 1 (a). FIG. 2 is a schematic cross-sectional view taken along a line A-A of FIG. 1 (b). Then, FIG. 2 is the schematic view so that a measurement of each part is not precisely shown. Also, a scale of FIGS. 1 (a) and (b) is different from that of FIG. 2.

As shown in FIG. 1 (a), FIG. 1 (b) and FIG. 2, a strain sensor 1 is provided with a base 11, supports 12, optical fiber 13 and fixing materials 14. As shown in FIG. 1 (a) and FIG. 1 (b), in planar view the base 11 has an outward shape of a regular triangle whose vertexes are curved.

As shown in FIG. 1 (a), in the base 11 a plurality of (three here) the supports 12 (12a, 12b and 12c) is provided in a state of being objects to be rotated by setting a center of a gravity of the regular triangle as a point of symmetry (a rotational center). As shown in FIG. 2, the supports 12 are formed to protrude from the base 11 and the optical fiber 13 is wound around each of the support 12. As shown in FIG. 1 (a), in this example, each support 12 is a round shape in planar view. Then, when it is necessary to distinguish each support 12 hereinafter, in FIG. 1 (a) a support at the lower left is referred to as support 12a, at the upper part is support 12b, and at the lower right is support 12c.

It is not especially limited, however, in this embodiment each support 12 is unified with the base 11. Materials used for the base 11 and the supports 12 are not especially limited. For example, the material may be resin or metal. Herein, the base 11 and each support 12 are made of stainless steel. Also, the base 11 and the supports 12 can be constituted as separated members. In this case, materials used for the base 11 and the supports 12 may be the same or different.

The optical fiber 13 is arranged to have parts directing to different directions each other between the supports 12 as viewed from an opposite direction to the base 11. In this example, the parts of the fiber directing to the different directions each other between the supports 12 is constituted by changing directions of one optical fiber. As described above, in this example, when one part of the optical fiber is regarded as 0 degrees, other parts are to direct to directions of 60 degrees and 120 degrees. Namely, when a fiber part 13c stretched between the support 12a and the support 12c is regarded as 0 degrees, a fiber part 13a stretched between the support 12a and the support 12b and a fiber part 13b stretched between the support 12b and the support 12c respectively direct to directions of 60 degrees and 120 degrees. Also, in this example, the optical fiber 13 is arranged so that each of the fiber part 13a, 13b and 13d can intersect on the point of symmetry as described above (or nearby the point of symmetry) in order to make a sensing point smaller. Viewed from an aspect of enhancing measurement accuracy, each of the fiber part 13a, 13b and 13c is preferably arranged parallel to a surface of a measuring object. Namely, the optical fiber 13 is an equal height (here, a distance from the base 1) between each support 12 and the height is changed at portions being in contact with each support 12 preferably.

In this embodiment, FBGs (fiber Bragg gratings) 15 (15a, 15b and 15c) having different wavelengths respectively are arranged in each of the fiber part 13a, 13b and 13c. Hereinafter, when it is necessary to distinguish each FBG 15, the FBG 15 in each of the fiber parts 13a, 13b and 13c is respectively referred to as a FBG 15a, a FBG 15b and a FBG 15c. Also, in the drawings, the FBGs 15 are shown in white for convenience' sake of illustration.

As known, the FBG reflects light whose wavelength regulated by Bragg wavelength. The FBG is formed by a plurality of diffraction gratings installed at a given interval in a core of the optical fiber and the Bragg wavelength is proportional to a product of reflective index of the optical fiber and the interval between the diffraction gratings. Thus, the FBG is stretched by strain so that the interval between the diffraction gratings forming the FBG extends, thereby the optical wavelength reflected by the FBG becomes larger. Also, the FBG is compressed by strain so that the interval between the diffraction gratings forming the FBG narrows, thereby the optical wavelength reflected by the FBG becomes smaller. As described above, each of the fiber part 13a, 13b and 13c (each of the FBGs 15a, 15b and 15c) directs to different directions respectively. Accordingly, strain amount obtained in the fiber part 13a, 13b and 13c is analyzed by rosette analysis, thereby the amount and directions of the strain can be obtained. As such a method for detecting the strain is known, a detailed description is omitted. Also, the Bragg wavelength of each of the FBGs 15 is different so that reflecting positions of reflected light are easily distinguished on the basis of the wavelength of the reflected light.

The optical fiber 13 is fixed to each of the supports 12 by the fixing materials 14 in a state in which tension is applied to the fiber parts 13a, 13b and 13c between each of the supports 12. As long as the fixing materials 14 fix the optical fiber 13 to the supports 12 in the state in which the tension is applied to the optical fiber 13, the material thereof is not especially restricted. Here, an adhesive is used as fixing materials 14. It is not especially limited, but, as shown in FIG. 1 (a), in this embodiment the fixing materials 14 fix the optical fiber 13 to the supports 12 at eight points at ends of the supports 12 side of the fiber parts 13a, 13b and 13c and at ends of the supports 12 side of the optical fiber 13 led out of the strain sensor 1.

Any known method like an adhesive, spot welding and the like can be employed in order to fix the strain sensor 1 on the measuring object. As described above, the strain sensor 1 is made of stainless steel. When a surface of the measuring object is metal, the strain sensor 1 can be fixed by the spot welding. Thus, the strain sensor 1 in this embodiment has recessed parts 21 used for the spot welding. As shown in FIG. 1 (b) and FIG. 2, the recessed parts 21 are formed on a surface of the base 11 on which the supports 12 are not formed. Also, the recessed parts 21 are formed in a center of the each of the supports 12 in planar view and bottom parts 22 of the recessed parts 21 are formed as thin parts used for the spot welding. In FIG. 1 (a), external form of the recessed parts 21 is shown by broken lines.

As shown in FIG. 2, when the strain sensor 1 is fixed to a measuring object 100 by the spot welding, the strain sensor 1 is arranged in a state in which a side the optical fiber 13 is present (the supports 12 side) faces to the measuring object 100. Then, in a state in which the thin parts of the bottoms 22 of the recessed parts 21 are made in contact with the measuring object 100, the thin parts and the surface of the measuring object 100 are spot welded.

In this embodiment, the base 11 has through grooves 25 between each supports 12. Namely, the base 11 has a configuration in which a plurality of the island-shaped members in which each of the supports 12 is respectively provided is connected by connections 26 (connection beams). In such a configuration, after the strain sensor 1 is fixed to the measuring object 100, each of the connections 26 is cut and removed, thereby the base 11 can be separated into each island-shaped member. Details with respect to the separation of the base 11 are described hereinafter.

Figure 3:
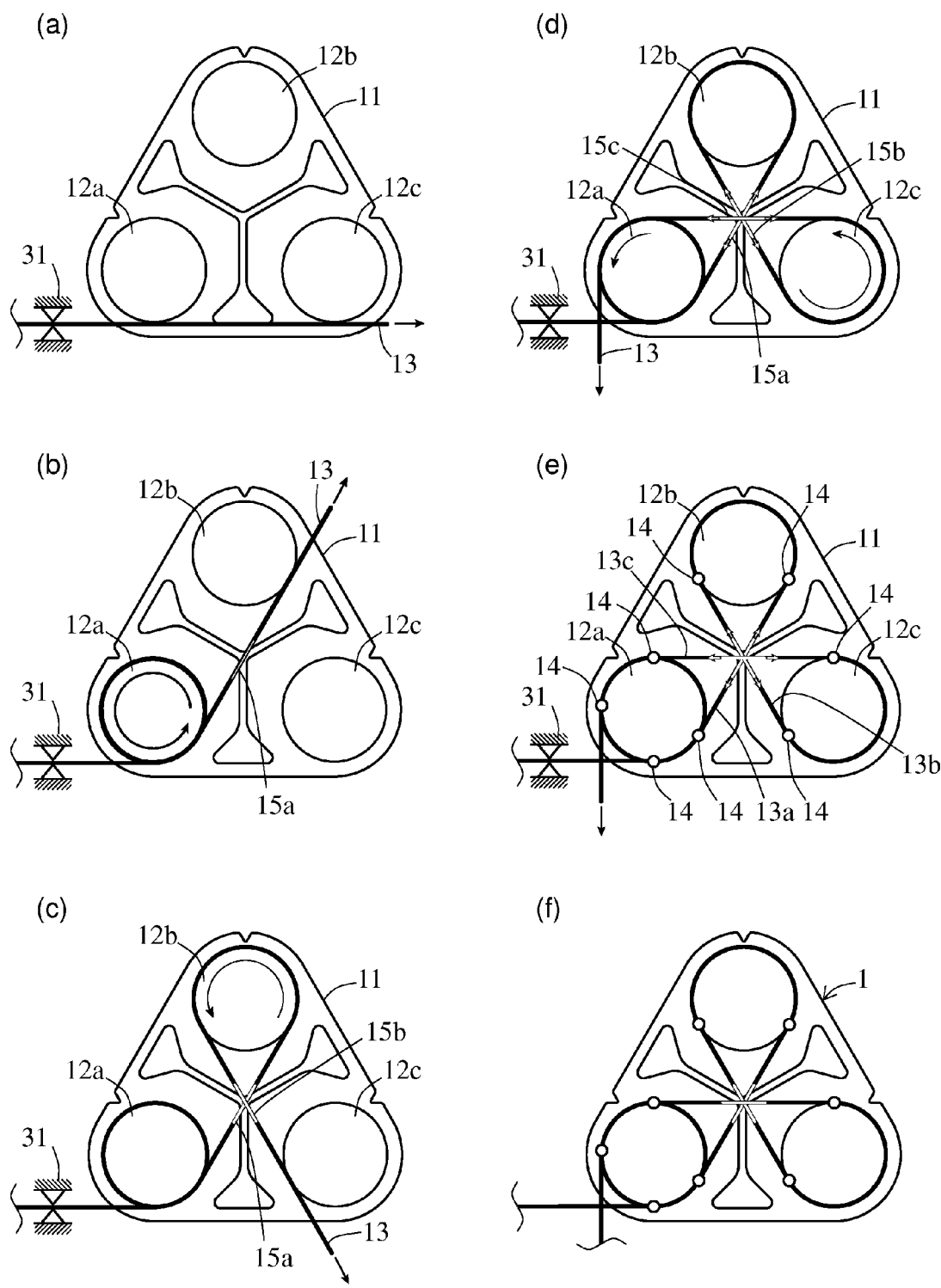
FIGS. 3 (a) to (f) are illustrations showing an example of an assembly process of the strain sensor in accordance with an embodiment of the present invention.

Next, a process of assembling the strain sensor 1 is described. FIGS. 3 (a) to (f) show an example of the process of assembling the strain sensor according to this embodiment. Firstly, one end of the optical fiber 13 is temporarily fixed by a clamp and the like (FIG. 3 (a)). Next, the optical fiber 13 is wound around the support 12a (FIG. 3 (b)). In this example, the optical fiber 13 is wound around all circumference of the support 12a. Also, at that time, a position of the optical fiber 13 is adjusted in a state of being released from fixation of the clamp 31 so that the FBG 15a in the optical fiber 13 is set on the point of symmetry as described above. After the adjustment, the one end of the optical fiber 13 is fixed by the clamp 31 again.

The optical fiber 13 is continuously wound around the support 12b (FIG. 3 (c)). Here, the optical fiber 13 is wound around 12b so that the fiber part 13a can be parallel to the surface of the base 11. In this example, the optical fiber 13 is wound around about two thirds of circumference of the support 12b. In this embodiment, each of the FBGs 15a, 15b and 15c is preliminarily formed in the optical fiber 13 at intervals so as to be arranged at the point of symmetry as described above when the optical fiber 13 is wound around each of the supports 12a, 12b and 12c. Thus, the FBG 15b in the fiber part 13b is to be arranged at the point of symmetry as described above without any special adjustment. Further, the intervals between each FBG 15a, 15b and 15c can be calculated by geometric calculation on the basis of a form and arrangements of the supports 12a, 12b and 12c.

Next, the optical fiber 13 is wound around the support 12c and is further wound around the support 12a (FIG. 3 (d)). Here, the optical fiber 13 is wound around the supports 12c and 12a so that the fiber part 13b and the fiber part 13c are to be parallel to the surface of the base 11. In this example, the optical fiber 13 is wound around about two thirds of the circumference of the support 12b and also about one fourth of the circumference of the support 12a. At that time, the FBG 15c is to be arranged at the point of symmetry as described above without any special adjustment.

In this state, tension (pretension) is applied to each of the fiber parts 13a, 13b and 13c. According to the configuration of this embodiment, the equal degree of tension can be easily applied to each of the fiber parts 13a, 13b and 13c by pulling another end of the optical fiber 13. Then, the optical fiber 13 is fixed to the supports 12 by the fixing materials 14 in the state in which given tension is applied (FIG. 3 (e)). When fixation by the fixing materials 14 is completed, the another end of the optical fiber 13 is stopped being pulled and concurrently temporary fixation by the clamp 31 is relieved (FIG. 3 (f)).

Therefore, according to the configuration of this embodiment, homogeneous tension can be extremely easily applied to each part of the optical fiber 13. As a result, strain in a compressive direction can be accurately detected. In the example as described above, abutment surfaces of the supports 12 with the optical fiber 13 are constituted of a flat surface, but grooves to determine positions around which the optical fiber 13 is wound may be formed.

Figure 4:
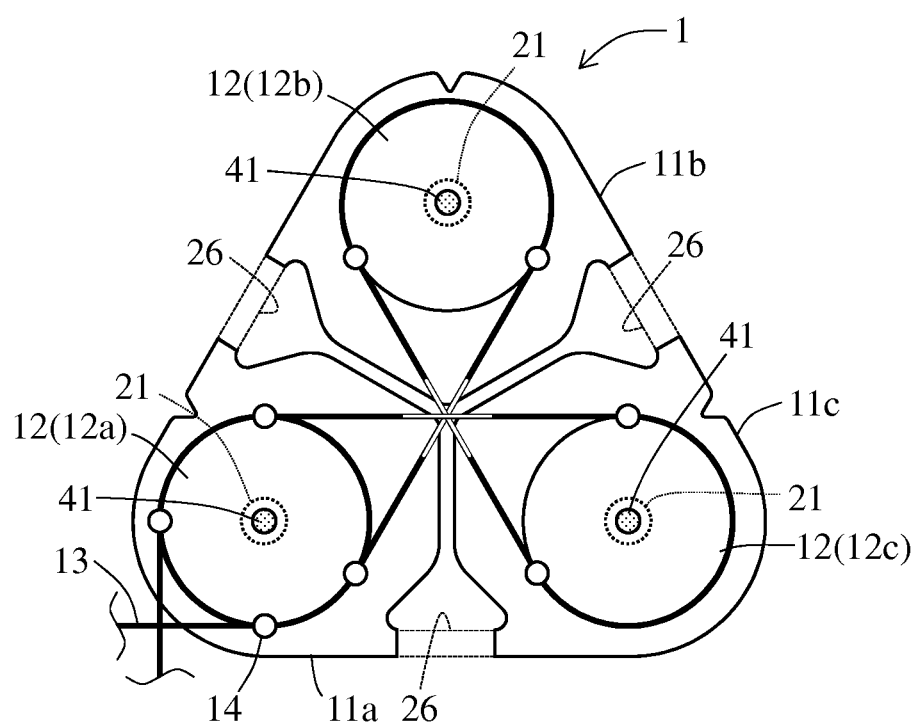
FIG. 4 is illustration showing a separation of the strain sensor in accordance with an embodiment of the present invention.
Figure 5:
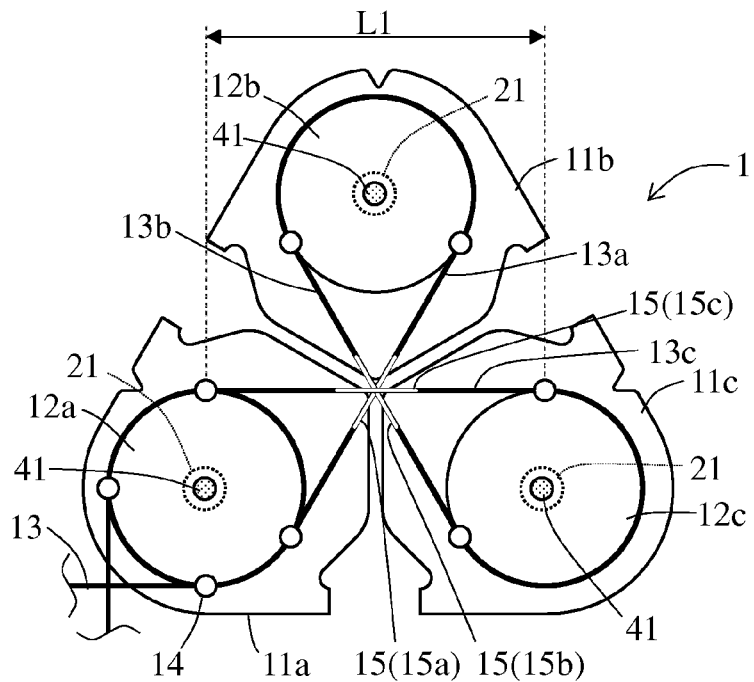
FIGS. 5 (a) and (b) are schematic views showing a function of the strain sensor in accordance with an embodiment of the present invention.
Figure 5:
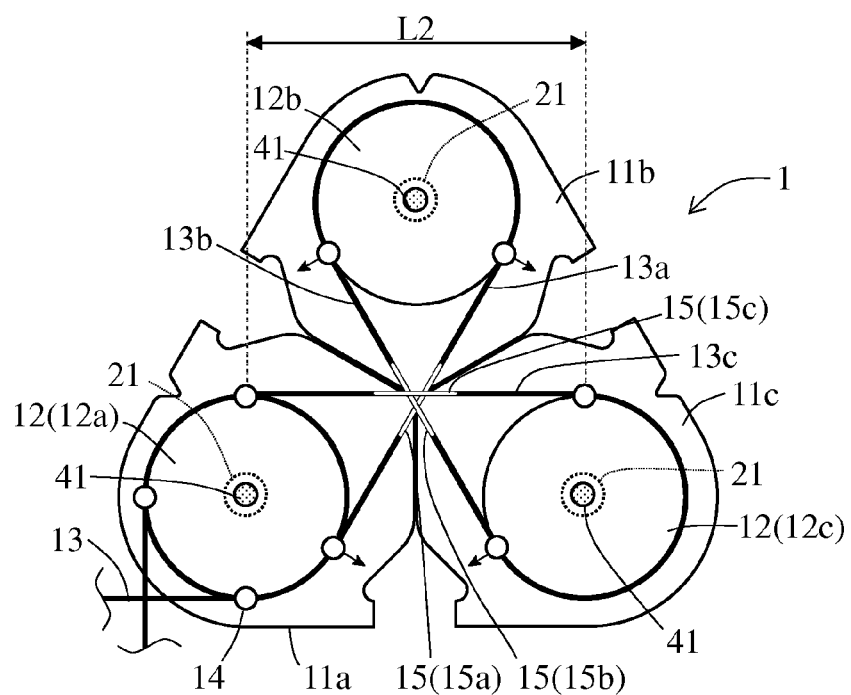

Next, separation of the base 11 is described on the basis of FIG. 4, FIG. 5 (a) and FIG. 5 (b). FIG. 4 illustrates the separation of the strain sensor 1. FIG. 5 (a) and FIG. 5 (b) are schematic views showing functions of the separated strain sensor. FIG. 4, FIG. 5 (a) and FIG. 5 (b) illustrate the strain sensor 1 as viewed from the measuring object side. Also, in FIG. 4, FIG. 5 (a) and FIG. 5 (b), spot welded parts 41 are shown in half-tone dot meshed.

As described above, the strain sensor 1 can be separated into the island-shaped members 11a, 11b and 11c respectively by cutting and removing the connections 26. Then, the base 11 is separated into every support 12a in the strain sensor 1 fixed to the measuring object, thereby a range of strain amount to be able to be measured can be expanded.

As shown in FIG. 5 (a), after the connections 26 are cut and removed, each of the island-shaped members 11a, 11b and 11c is independent respectively so as not to be affected by other island-shaped members. For example, when large strain is generated in the measuring object, the base 11 will not be extensively deformed in accordance with a configuration employing the single-structured base 11. Therefore, when a large strain exceeding a limit of deformation of the base 11 is generated, stress is concentrated in a part of the base 11 so that the strain cannot be accurately detected. On the other hand, a configuration in which each of the island-shaped members 11a, 11b and 11c is separated can be deformed more largely than the single-structured base 11.

Therefore, in comparison with the conventional art, the range of strain amount which can be measured can be expanded.

Under the circumstance in which an ambient temperature varies and thermal expansion (or thermal contraction) occurs, in a configuration of employing the single-structured base 11, a Bragg wavelength of the FBG 15 varies with the thermal expansion (or thermal contraction) of the base 11. Then, it is conventionally necessary to provide a FBG for temperature correction and correct the temperature of the FBG 15 for strain detection on the basis of wavelength variations of reflected light by the FBG for the temperature correction. On the contrary, in the configuration of which each of the island-shaped members 11a, 11b and 11c is separated, the thermal expansion occurs, thereby each of the island-shaped members 11a, 11b and 11c expands around the spot welded parts 41 as indicated by arrows in FIG. 5 (b). Then, degree of the thermal expansion is equal in each of the island-shaped members 11a, 11b and 11c as material thereof is the same. In this case, in each fiber part 13a, 13b and 13c, stress in an axial direction of the optical fiber 13 does not work so that deformation in the axial direction does not occur. For example, a length L1, which is a length of the fiber part 13c when the thermal expansion does not occur, is nearly equal in length to a length L2, which is a length of the fiber part 13c when the thermal expansion occurs. As a result, highly accurate measurement can be performed without correcting temperature.

In addition, when the thermal expansion (or the thermal contraction) occurs, in the configuration of employing the single-structured base 11, the stress tends to be concentrated in the spot welded parts 41 arising from difference of coefficient of thermal expansion between the measuring object and the base. In this case, in the same manner as the occurrence of the large strain as described above, the strain cannot be accurately detected. On the contrary, in the configuration of which each of the island-shaped members 11a, 11b and 11c is separated, the stress is not concentrated in the spot welded parts 41 so that the strain can be accurately detected. Further, deterioration of welding strength arising from concentration of the stress on the spot welded parts 41 can be prevented.

As described above, the tension can be relatively easily applied to the optical fiber 13 in the strain sensor 1. Also, the configuration in which the resin sealing is not employed as the conventional configuration, the fixed areas of the optical fiber 13 are hard to be peeled so that long-term reliability can be relatively easily secured. Further, any material not being limited to resin but metal and the like can be used for the base 11 and the supports 12 so that, for example, the material having the equal degree of coefficient of thermal expansion or a relatively close coefficient of thermal expansion can be employed in the base conforming to material of the surface of the measuring object. Accordingly, the strain on the surface of the measuring object can be accurately detected.

Also, the base 11 can be separated into every support 12, thereby in comparison with the conventional art the range of the strain amount which can be measured can be expanded. Further, it is possible not to need to correct the temperature.

Figure 6:
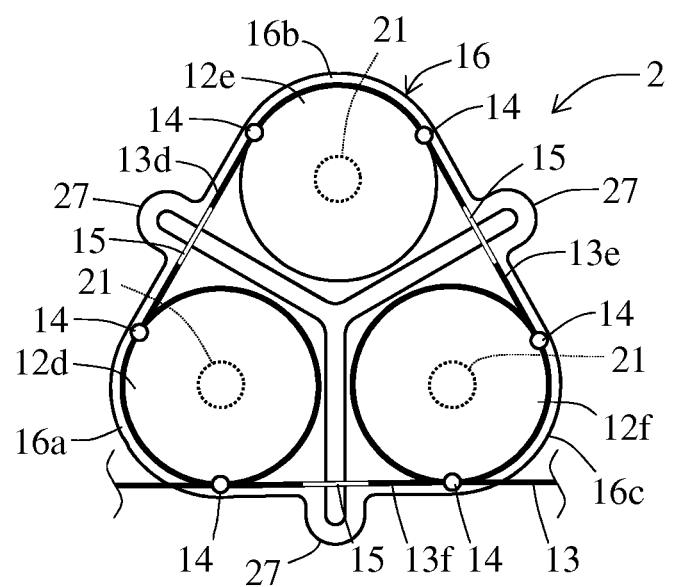
FIG. 6 is a schematic structural view showing other example of the strain sensor in accordance with an embodiment of the present invention.

According to the above-described configuration, the supports 12 are arranged so as to be a rotational symmetry as viewed from the opposite direction to the base 11 and each of the fiber parts 13a, 13b and 13c passes adjacent to the point of symmetry. The fiber parts, however, may be arranged apart from the point of symmetry. For example, as shown in FIG. 6, the optical fiber 13 can be arranged so as to envelop outer edges of supports 12d, 12e and 12f as viewed from an opposite direction to a base 16 which is almost regular rectangle in shape. In such a strain sensor 2, fiber parts 13d, 13e and 13f directing to different directions each other between the supports 12 have a positional relationship in which each of the fiber parts is not overlapped. Cross-sectional structures of the base 16 and the supports 12d, 12e and 12f are the same as those of the base 11 and the supports 12a, 12b and 12c as described above. According to this configuration, a sensing point is expanded so that it is considered that measurement accuracy can be deteriorated, however, the strain sensor 2 can be more miniaturized than the strain sensor 1.

Even in such a configuration, the base 16 can be preferably separated into each of island-shaped members 16a, 16b and 16c having each support 12d, 12e and 12f respectively. In the strain sensor 2, each of the island-shaped members 16a, 16b and 16c are connected by U-shaped connections 27 (connection beams) in planar view so that the connections 27 are cut and removed, thereby the base 16 are separated into the island-shaped members 16a, 16b and 16c.

In the above example, the fiber parts 13a, 13b and 13c are composed by one optical fiber 13 as described above, however, each fiber part can be composed by a plurality of respectively independent optical fibers. In this case, force to pull each optical fiber is adjusted in assembly so that equal tension is applied to each fiber part.

Incidentally, in the above-described example the base has a unified configuration of each of the island-shaped members by using beam-shaped connections, however, each of the island-shaped members may be separated from the beginning. In this case, the optical fiber is wound around in a state in which each of the island-shaped members is temporarily connected by a connecting member which functions as a connection.

Figure 7:
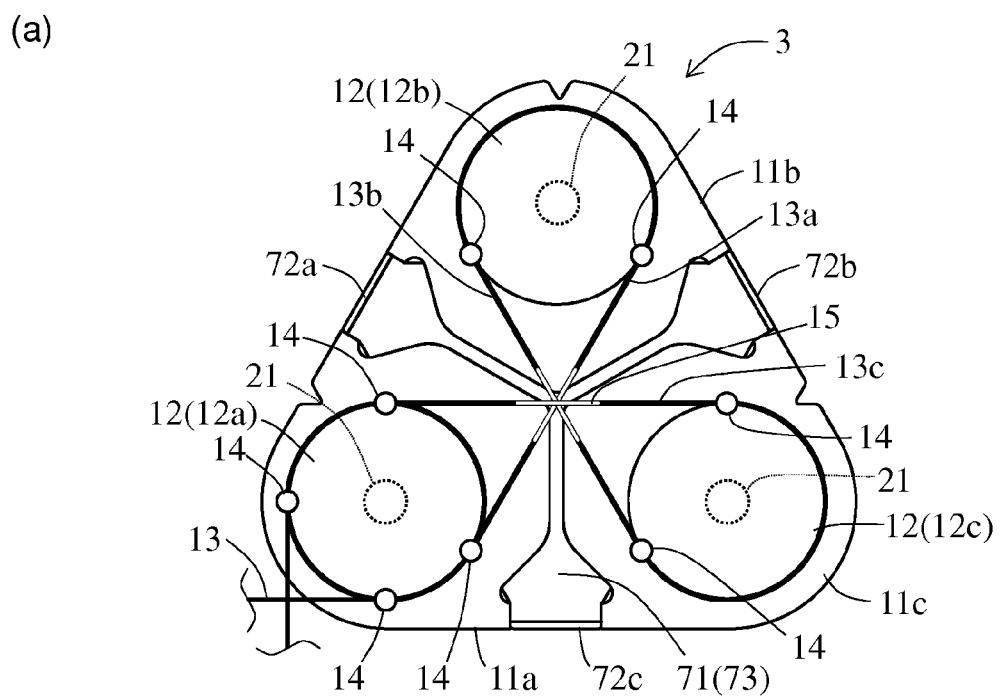
FIGS. 7 (a) and (b) are schematic structural views showing other example of the strain sensor in accordance with an embodiment of the present invention.
Figure 7:
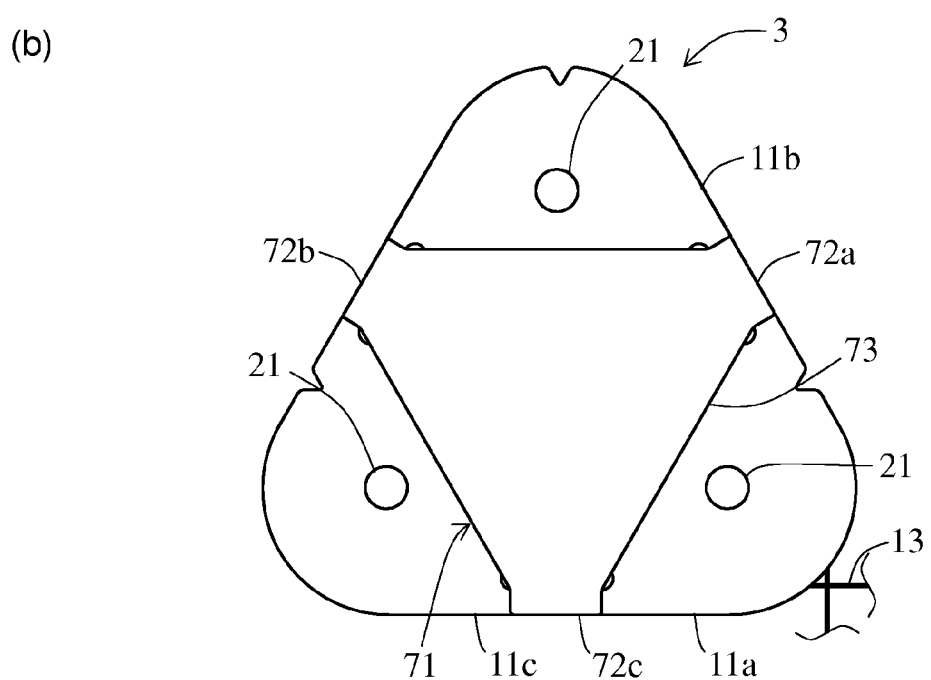

FIG. 7 (a) and FIG. 7 (b) are schematic structural views showing a whole configuration of an example of a strain sensor provided with a base temporarily connected by the connecting member. FIG. 7 (a) is the view showing a surface on which a surface of a measuring object is fixed and FIG. 7 (b) is the view showing an opposite surface of the FIG. 7 (a). Also, in FIG. 7 (a) and FIG. 7 (b), components having the same effect as those described in FIG. 1 (a) and FIG. 1 (b) have the same reference signs as FIG. 1 (a) and FIG. 1 (b).

As shown in FIG. 7 (a) and FIG. 7 (b), a strain sensor 3 has island-shaped members 11a, 11b and 11c, supports 12 (12a, 12b and 12c), an optical fiber 13, fixing materials 14 and a connecting member 71. The connecting member 71 has a configuration in which spacers 72a, 72b and 72c are integrally connected by a triangular plate-like part 73 in planar view. The spacer 72a is arranged between the island-shaped member 11a and the island-shaped member 11b. The spacer 72b is arranged between the island-shaped member 11b and the island-shaped member 11c. The spacer 72c is arranged between the island-shaped member 11c and the island-shaped member 11a. The spacers 72a, 72b and 72c function as spacers to hold the intervals between each of the island-shaped members 11a, 11b and 11c at a predetermined interval.

In this example, the intervals held by the spacers 72a, 72b and 73 are as equal as the intervals in the base 11 having the connections 26 as described above. Therefore, the spacers 72a, 72b and 72c are arranged between each of the island-shaped members 11a, 11b and 11c so that island-shaped members 11a, 11b and 11c are arranged in a state of having the same external form as the base 11 has. It is not especially limited, but, in this example, the spacers 72a, 72b and 72c are arranged in outer edge portions of each island-shaped member 11a, 11b and 11c, while the connecting member 71 is designed so that the external form of the each island-shaped member 11a, 11b and 11c and the connecting member 71 becomes almost regular rectangle (sides become flat).

In this state, according to the process of assembly as described above, the optical fiber 13 is wound around each of the supports 12a, 12b and 12c so that the spacers 72a, 72b and 72c of the connecting member 71 is caught between each of the island-shaped members 11a, 11b and 11c. As a result, the connecting member 71 is not released as long as external force is not given.

Until the optical fiber 13 is wound around each of the supports 12a, 12b and 12c, the spacers 72a, 72b and 72c are not caught between each of the island-shaped members 11a, 11b and 11c so that the connecting member 71 is easily released. Accordingly, when the optical fiber 13 is wound around, the connecting member 71 is temporarily fixed to each of the island-shaped members 11a, 11b and 11c with an adhesive tape and the like, or the island-shaped members 11a, 11b and 11c are hold not to be separated by using dedicated tools and the like preferably.

Figure 8:
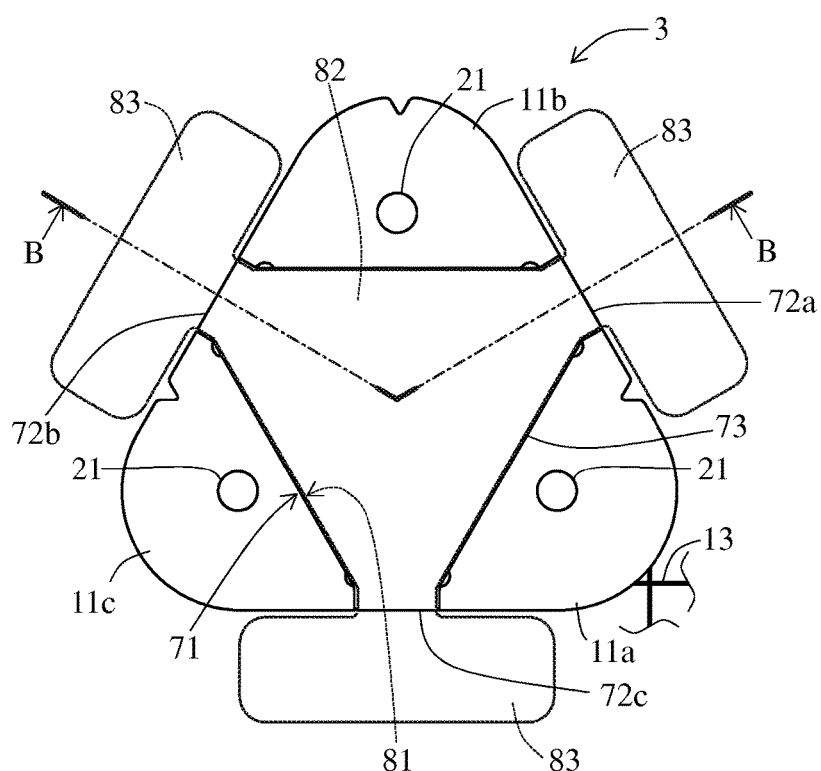
FIGS. 8 (a) to (d) are illustrations showing a separation process of the strain sensor in accordance with an embodiment of the present invention.
Figure 8:
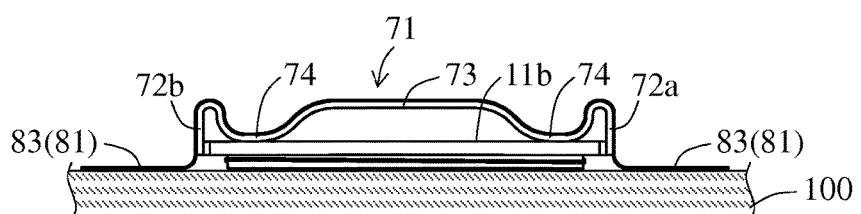
Figure 8:
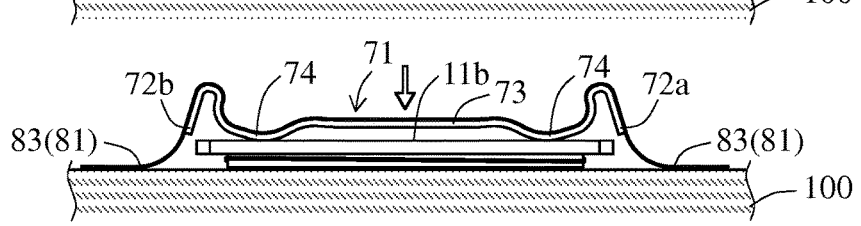
Figure 8:
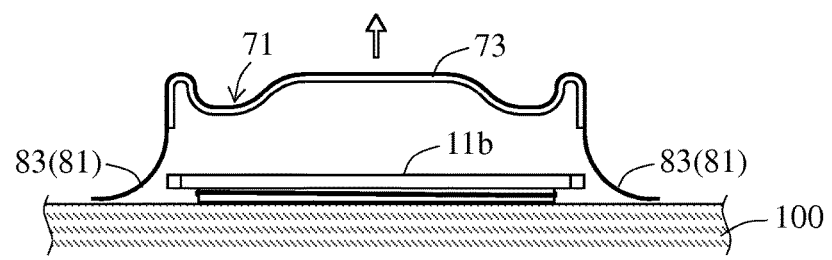

When the strain sensor 3 having the above-described configuration is fixed to a measuring object, suppose that the external force is added to the connecting member 71 while working, the connecting member 71 may be released. Therefore, in the strain sensor 3 according to this embodiment, an adhesive tape is provided in order to temporarily fix the strain sensor 3 to the measuring object. FIG. 8 (a) shows the strain sensor 3 provided with the adhesive tape. As shown in FIG. 8 (a), the adhesive tape 81 has a base part 82 whose external form is slightly smaller than that of the plate-like part 73 in planar view and a temporary fixing part 83 which passes from the base part 82 on each of the spacers 72a, 72b and 72c and protrudes outside of the strain sensor 3. The base part 82 is attached on the plate-like part 73 of the connecting member 71. In FIG. 8 (a), the adhesive tape 81 is shown by dotted line for illustration.

When the strain sensor 3 is fixed to the measuring object, a worker temporarily fixes the strain sensor 3 on the surface of the measuring object using the temporary fixing parts 83, thereby in this state the worker spot welds the strain sensor 3 to the measuring object by using the recessed part 21. After the spot welding, the connecting member 71 is released so that the strain sensor 3 is the same configuration as the strain sensor 1 as shown in FIG. 5 (a). As described above, the connecting member 71 is just caught by each of the island-shaped members 11a, 11b and 11c so as to be easily released with a relatively small external force.

It is not especially limited, but, according to a configuration employed in this embodiment, the plate-like part 73 of the connecting member 71 is a plate spring so that the connecting member 71 is released by pressing the plate-like part 73 toward a direction of the measuring object. FIGS. 8 (b) to (d) are schematic views showing a process of releasing the connecting member 71. FIGS. 8 (b) to (d) show cross sections taken along a line B-B indicated in FIG. 8 (a).

FIG. 8 (b) shows the strain sensor 3 fixed to a measuring object 100. As shown in FIG. 8 (b), the plate-like part 73 has an abutment part 74 abutting to the island-shaped members 11a, 11b and 11c adjacent to the spacers 72a, 72b and 72c, while a center part of the plate-like part 73 is rising from the island-shaped members 11a, 11b and 11c.

In this state, when the center part of the plate-like part 73 is pressed toward the measuring object 100, accompanied by pressing the spacers 72a, 72b and 72c are lifted to a direction away from the measuring object 100 (FIG. 8 (c)). Thereby, the connecting member 71 is released from the island-shaped members 11a, 11b and 11c.

After that, as shown in FIG. 8 (d), the connecting member 71 is lifted to the direction away from the measuring object 100 so that the adhesive tape 81 is peeled off the measuring object 100, thereby the connecting member 71 can be completely released.

As described above, even the strain sensor 3 in which the island-shaped members are connected by the connecting member, the strain sensor 3 can obtain the same effect as the above described strain sensor 1.

Figure 9:
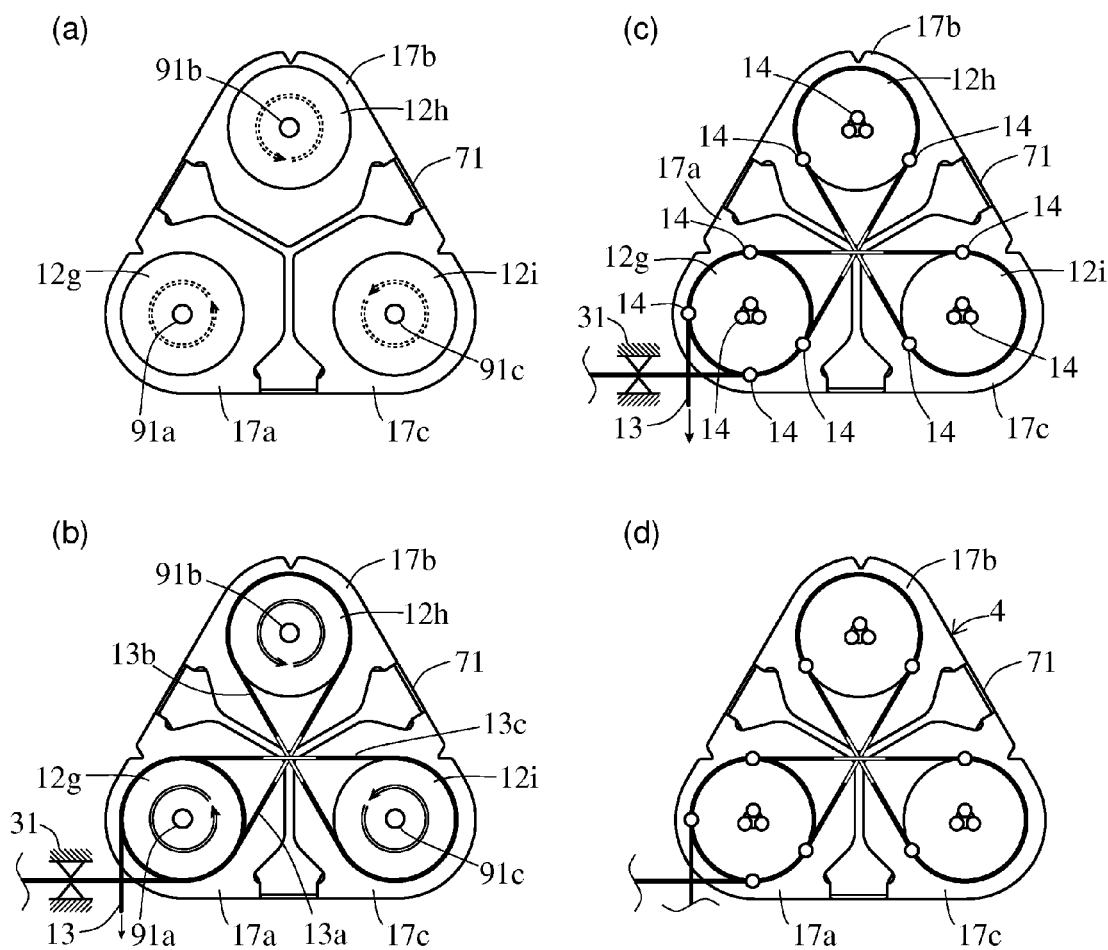
FIGS. 9 (a) to (d) are illustrations showing other example of an assembly process of the strain sensor in accordance with an embodiment of the present invention.

Other modifications are described below. FIGS. 9 (a) to (d) show an assembly process of a strain sensor 4 in which supports are capable of rotating to a winding direction of an optical fiber. In FIGS. 9 (a) to (d), a base used here has island-shaped members 17a, 17b and 17c connected by a connecting member 71, however, a base having an unified form of island-shaped members may be used.

As shown in FIG. 9 (a), supports 12g, 12h and 12i formed on island-shaped members 17a, 17b and 17c respectively are constituted so as to be capable of rotating around rotation axes 91a, 91b and 91c formed in a state of protruding from each of the island-shaped members 17a, 17b and 17c. It is not especially limited, but the island-shaped members 17a, 17b and 17c and the supports 12g, 12h and 12i can be made of resin, for example. In this case, for example, the strain sensor 4 is fixed to a measuring object by an adhesive. Also, as long as the supports 12g, 12h and 12i are capable of rotating around the rotation axes 91a, 91b and 91c, a configuration thereof is not especially limited.

An optical fiber 13 can be wound around each of the supports 12g, 12h and 12i by the same assembly procedure as illustrated in FIG. 3. In this modification, the optical fiber 13 is pulled in order to apply tension to each fiber part 13a, 13b and 13c so that each support 12g, 12h and 12i rotates, thereby, in comparison with a configuration in which each support does not rotate, an equal degree of tension can be easily applied to each fiber part 13a, 13b and 13c (FIG. 9 (b)).

Also, in this modification, the optical fiber 13 is fixed to the supports 12 by fixing materials 14 in a state in which a given tension is applied, while each support 12g, 12h and 12i as well is fixed to the corresponding rotation axes 91a, 91b and 91c (FIG. 9 (c)). After completion of fixation by the fixing materials 14, the optical fiber 13 is stopped to be pulled and released from temporary fixation by a clamp 31 in the same manner as described above (FIG. 9 (d)).

Figure 10:
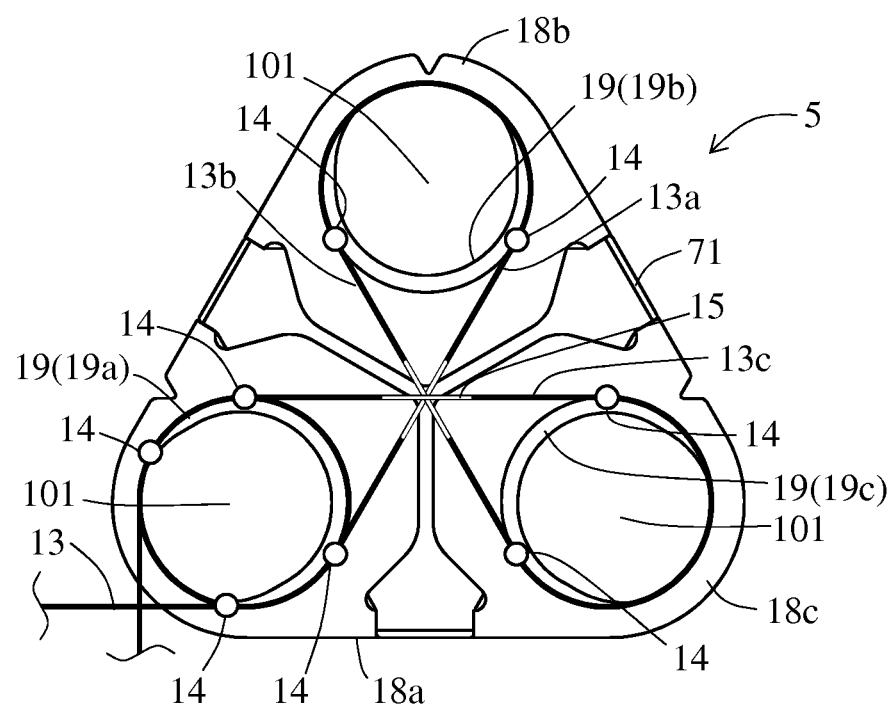
FIG. 10 is a schematic structural view showing other example of the strain sensor in accordance with an embodiment of the present invention.

Further, FIG. 10 shows another modification. In a strain sensor 5 shown in FIG. 10, supports are used for fixation of an optical fiber, while the optical fiber is wound around a temporarily set wound member.

As shown in FIG. 10, in this modification, supports 19 (19a, 19b and 19c) provided by each of island-shaped members 18a, 18b and 18c have wall surfaces at sides of fiber parts 13a, 13b and 13c and are U-shaped form in planar view. The supports 19 are formed protruding from the island-shaped members 18a, 18b and 18c in the same manner as the supports 12 as described above.

Further, in a position adjacent to each support 19 (herein, the position between the supports 19 and parts of an optical fiber 13 except for the fiber parts 13a, 13b and 13c), wound member arranging areas 101 in which the wound members around which the optical fiber 13 is wound are temporarily arranged when tension is applied to the fiber parts 13a, 13b and 13c.

It is not especially limited, but the island-shaped members 18a, 18b and 18c and the supports 19a, 19b and 19c can be made of resin, for example. In this case, for example, the strain sensor 5 is fixed to a measuring object by an adhesive. Also, in the strain sensor 5, a base used here has island-shaped members 18a, 18b and 18c connected by a connecting member 71, however, a base having an unified form of the island-shaped members may be used.

Figure 11:
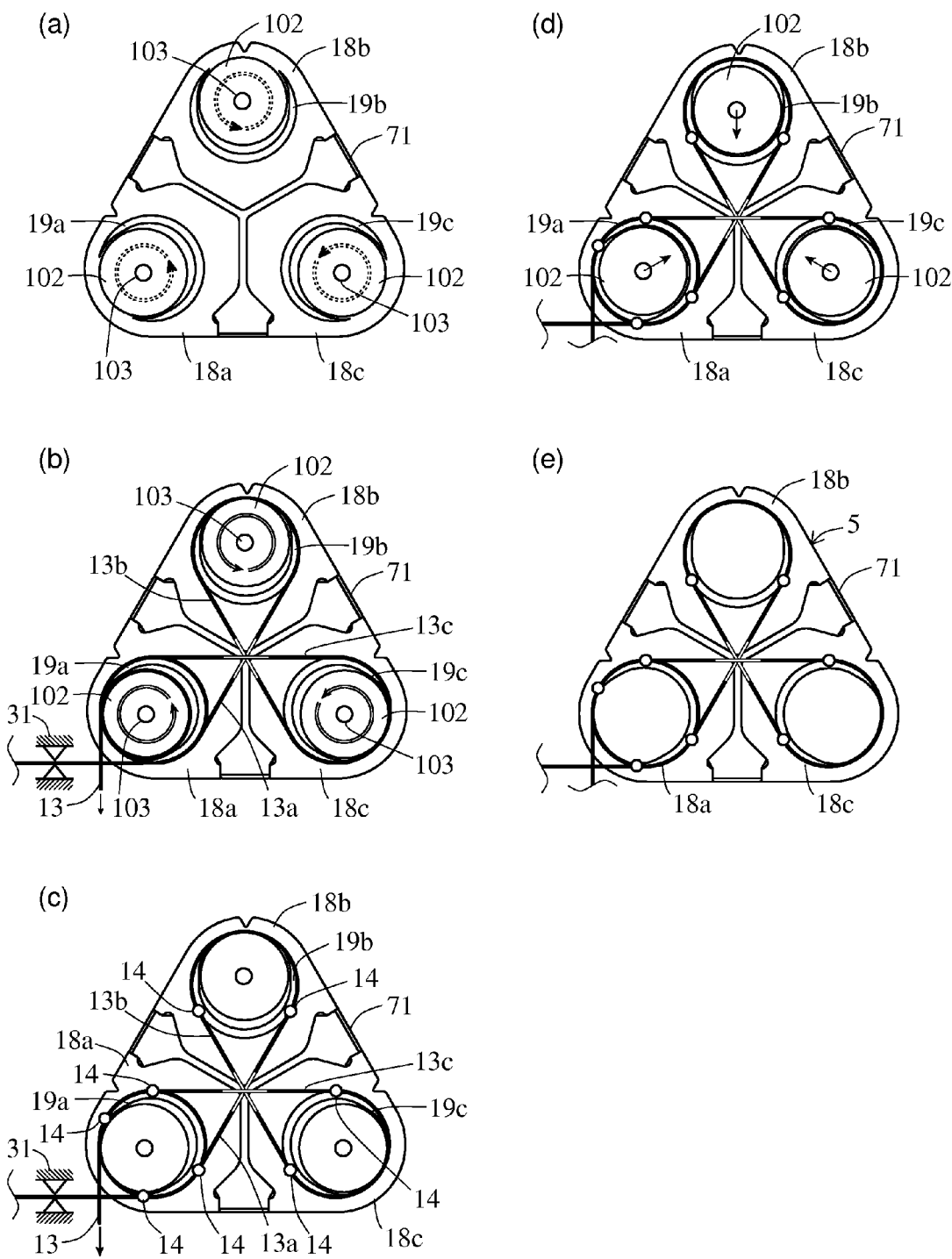
FIGS. 11 (a) to (e) are illustrations showing other example of an assembly process of the strain sensor in accordance with an embodiment of the present invention.

FIGS. 11 (*a*) to (*e*) show an example of assembly procedure of the strain sensor 5. As shown in FIG. 11 (*a*), the wound members 102 are arranged in the wound member arranging areas 101. The wound members 102 are circular in planar view and thickness thereof in a perpendicular direction to each island-shaped member 18a, 18b and 18c is the same degree as that of the supports 19. Also, the wound members 102 are capable of rotating around the rotation axes 103 arranged perpendicular to each island-shaped member 18a, 18b and 18c. It is not especially limited, but, for example, each of the wound members 102 supported by tips of the rotation axes 103 can be arranged in the wound member arranging areas 101 by moving the rotation axes 103. The wound members 102 are arranged in a state of holding intervals between each of the supports 19 and each of the wound members 102.

The optical fiber 13 can be wound around each support 19 in the same assembly procedure as illustrated in FIG. 3. In this modification, the optical fiber 13 is pulled in order to apply tension to the fiber parts 13a, 13b and 13c, thereby each wound member 102 rotates so that an equal degree of tension can be easily applied to each fiber part 13a, 13b and 13c (FIG. 11 (*b*)). In addition, the optical fiber 13 may be wound around whole parts composed by both each wound member 102 and each support 19 or only each wound member 102.

In a state in which the tension is applied, the optical fiber 13 is fixed to the supports 19 by the fixing materials 14 (FIG. 11 (*c*)). After completion of the fixation by the fixing materials 14, the optical fiber 13 is stopped to be pulled and released from the temporary fixation by a clamp 31 (FIG. 11 (*d*)). At the same time, each wound member 102 is moved toward directions of each support 19. Then, intervals are formed between each wound member 102 and the optical fiber 13 wound around each wound member 102 so that each wound member 102 is moved toward opposite directions to the island-shaped members 18a, 18b and 18c and is released (FIG. 11 (*e*)). Thereby, the strain sensor 5 is completed.

Even in this strain sensor 5, the same effect as in the strain sensor 1 and the strain sensor 3 can be obtained. Also, the supports 19 can employ any form not limited to U-shaped form as long as both ends of the fiber parts 13a, 13b and 13c can be fixed.

Figure 12:
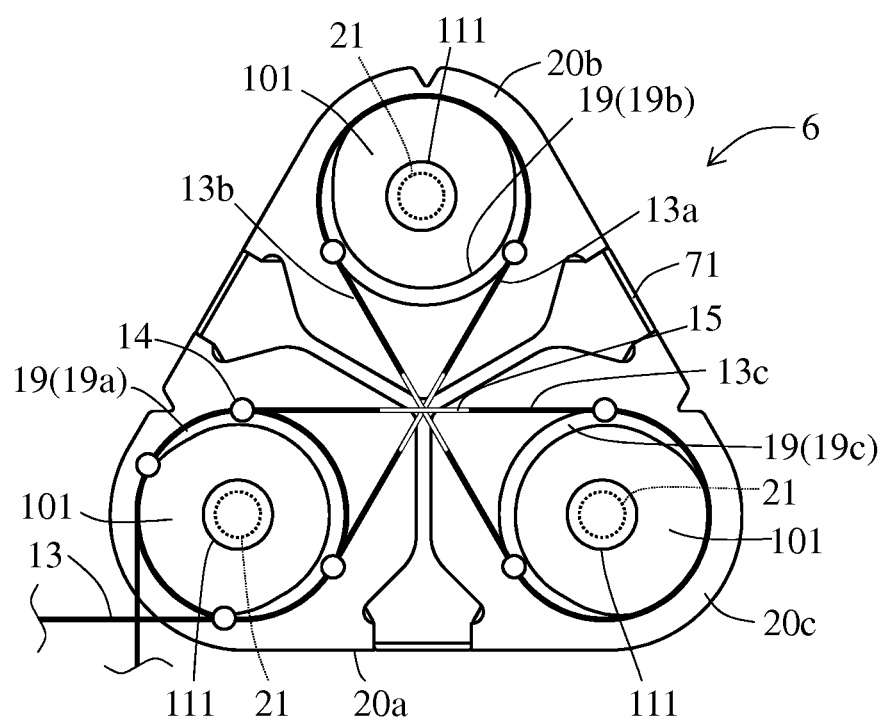
FIG. 12 is a schematic structural view showing other strain sensor in accordance with an embodiment of the present invention.

Further, as the strain sensor 5, the configuration of the temporarily arranged wound members around which the optical fiber 13 is wound can be attained even when a material of the island-shaped members is metal. FIG. 12 shows a configuration capable of fixing the strain sensor to a measuring object with spot welding when the material of the island-shaped member is metal.

As shown in FIG. 12, in a strain sensor 6, each island-shaped member 20a, 20b and 20c has the U-shaped supports 19 (19a, 19b and 19c) as described above. Also, in a position adjacent to each support 19, wound member arranging areas 101 in which the wound members around which the optical fiber 13 is wound are temporarily arranged when tension is applied to the fiber parts 13a, 13b and 13c.

Then, in this example, cylindrical protrusions 111 corresponding to the recessed parts 21 illustrated in FIG. 1 are formed in the wound member arranging areas 101. The protrusions 111 are formed so as to protrude from the island-shaped members 20a, 20b and 20c in the same manner as the supports 19. In the protrusions 111, recessed parts 21 recessed from an opposite surface of the island-shaped members 20a, 20b and 20c are formed. In this configuration, the recessed parts 21 is used in the same manner as described above, thereby the strain sensor 6 can be fixed to a measuring object by using spot welding. It is not especially limited, but, in this example, thickness of the protrusions 111 in a perpendicular direction to each island-shaped member 20a, 20b and 20c is larger than that of the supports 19, thereby the protrusions 111 only can be in contact with the measuring object when the strain sensor 6 is fixed to the measuring object.

In this case, rotation axes of the wound members 102 temporarily arranged in the wound member arranging areas 101 are to be constituted of hollow shafts capable of accommodating the protrusions 111.

Figure 13:
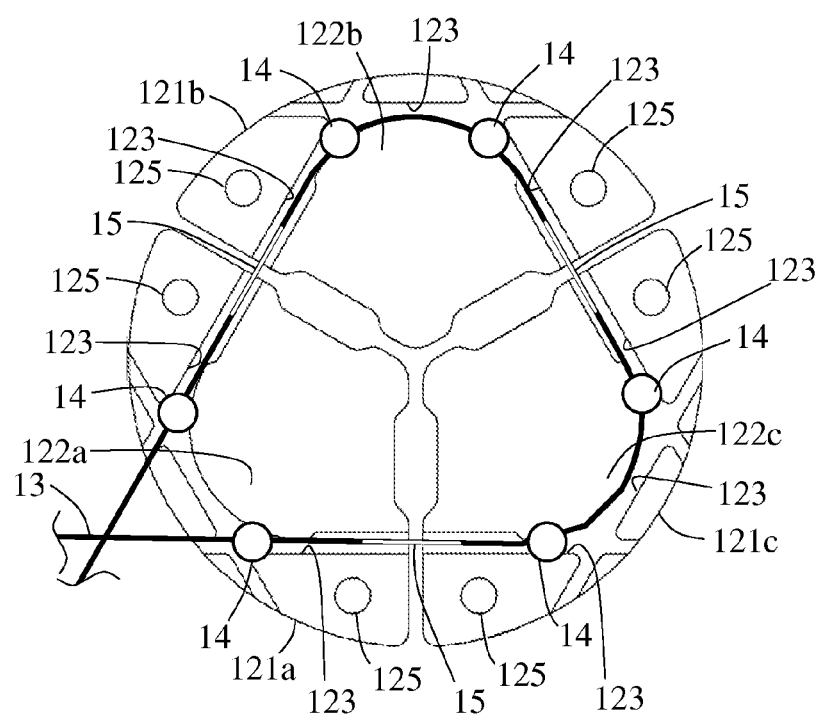
FIGS. 13 (a) and (b) are schematic structural views showing other example of the strain sensor in accordance with an embodiment of the present invention.
Figure 13:
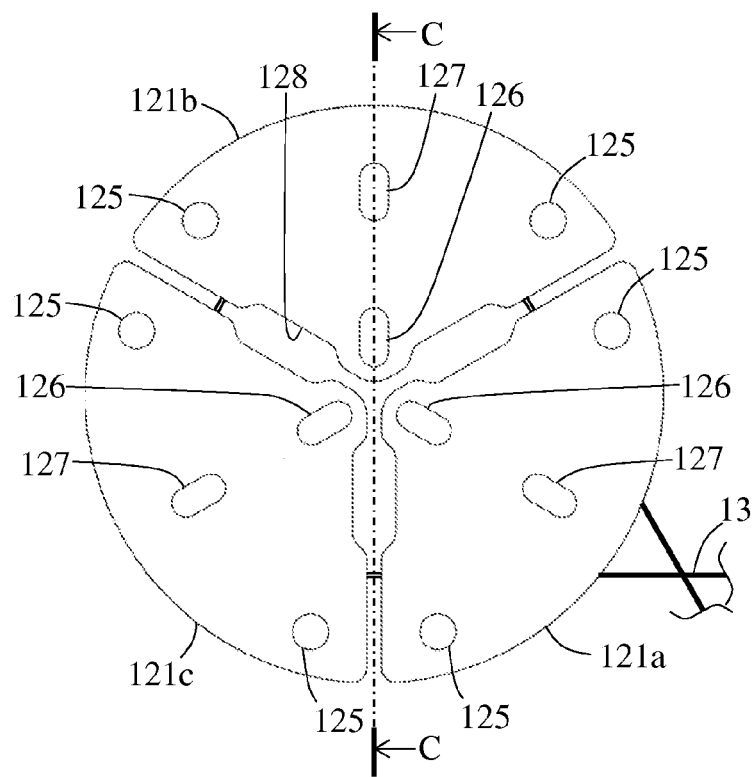
Figure 14:
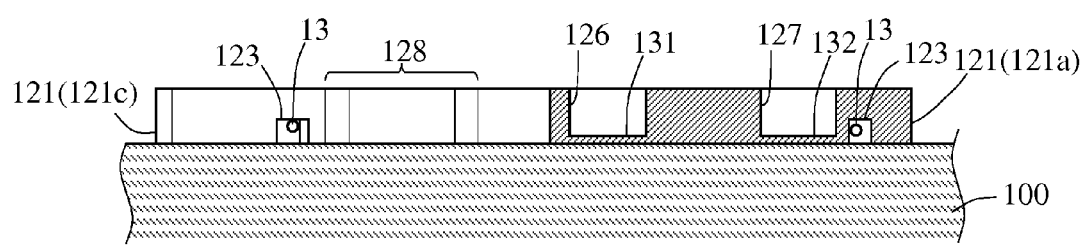
FIG. 14 is a schematic cross-sectional view showing other example of the strain sensor in accordance with an embodiment of the present invention.
Figure 15:
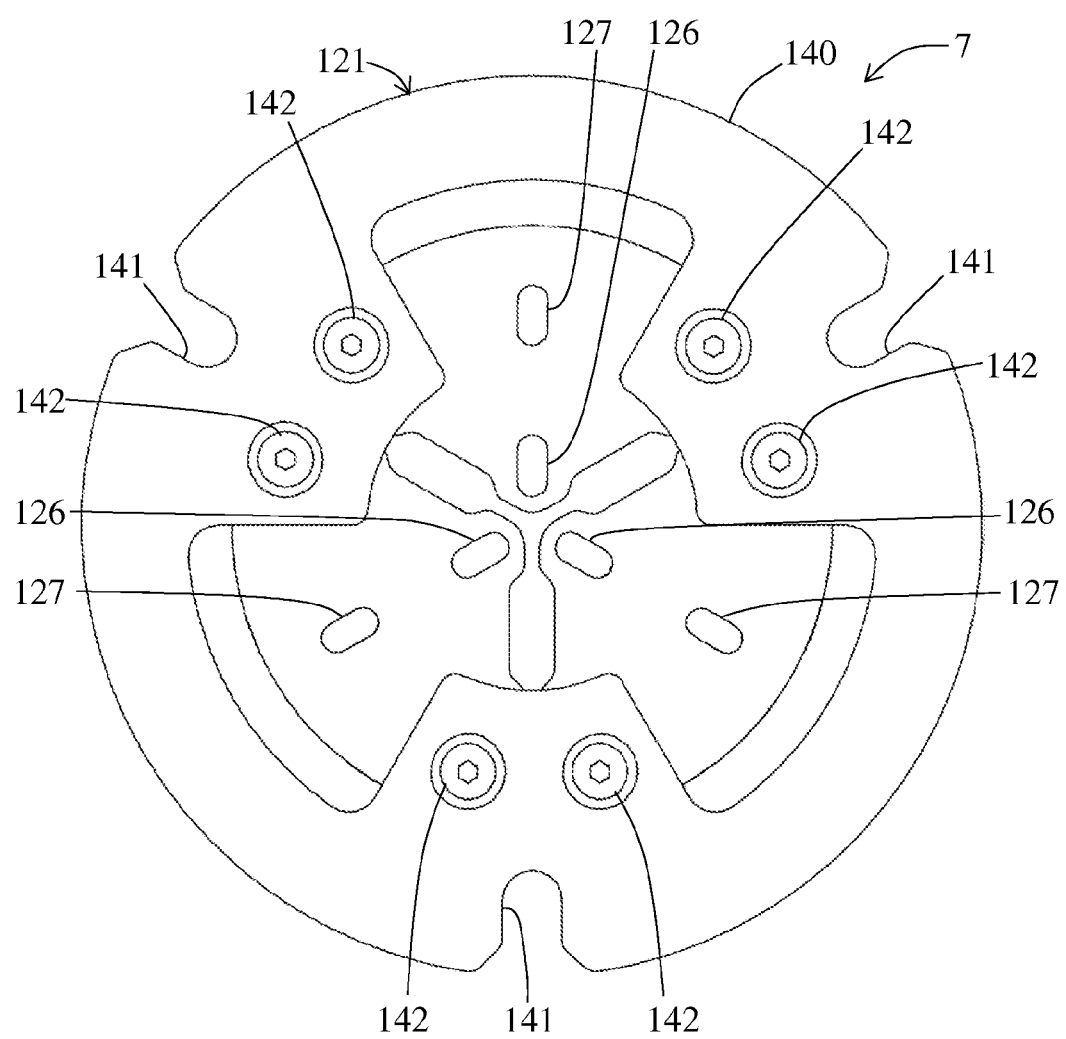
FIG. 15 is a schematic structural view showing other example of the strain sensor in accordance with an embodiment of the present invention.

FIG. 13 (*a*) and FIG. 13 (*b*) are schematic structural views showing another example of a strain sensor provided with a temporarily connected base with a connecting member. FIG. 13 (*a*) shows a surface on which a surface of a measuring object is fixed and FIG. 13 (*b*) shows an opposite surface of FIG. 13 (*a*). FIG. 14 is a schematic cross sectional view taken along a line C-C in FIG. 13 (*b*). In FIG. 13 (*a*), FIG. 13 (*b*) and FIG. 14, a connecting member is released and each island-shaped member is separated. FIG. 14 is the schematic view so that measurement of each part is not precisely shown. Also, a scale of FIG. 13 (*a*) and FIG. 13 (*b*) is different from that of FIG. 14. Further, FIG. 15 shows a state in which each island-shaped member is connected by the connecting member. Also, in FIG. 13 (*a*), FIG. 13 (*b*) and FIG. 14, the same reference signs are used for components having the same effect as those described above.

As shown in FIG. 13 (*a*), FIG. 13 (*b*), FIG. 14 and FIG. 15, a strain sensor 7 is provided with island-shaped members 121a, 121b and 121c, supports 122 (122a, 122b and 122c), an optical fiber 13, fixing materials 14 and a connecting member 140. In this strain sensor 7, a base 121 is constituted by the island-shaped members 121a, 121b and 121c and the connecting member 140 connecting each island-shaped member 121a, 121b and 121c with screws.

As shown in FIG. 13 (*a*) and FIG. 13 (*b*), in the strain sensor 7, each island-shaped member 121a, 121b and 121c has in planar view a fan-shaped form whose central angle is 120 degrees and which is made by dividing a circle into almost three. In each island-shaped member 121a, 121b and 121c, a groove 123 is formed from a center of one side of radius through a center of another side of radius. The grooves 123 contains linear grooves (hereafter, referred to as straight parts) formed from each of the radiuses to fan-shaped arcs and circular arcs (hereafter, referred to as curved parts) connecting the grooves extended from each radius. When each island-shaped member 121a, 121b and 121c is arranged in circular, the grooves 123 form a regular triangle whose vertex parts are curved. The center of a gravity of the regular triangle is a center of a circle constituted by the island-shaped members 121a, 121b and 121c.

In each of the island-shaped members 121a, 121b and 121c, portions 122a, 122b and 122c which are portions in center sides of the curved parts of the grooves 123 constitute as supports protruded from the base, thereby the optical fiber 13 is wound around these supports 122a, 122b and 122c. In this configuration, the optical fiber 13 is arranged in the grooves 123 so as to abut on the supports 122a, 122b and 123c, so that, in the same manner as the strain sensor 2 shown in FIG. 6, the optical fiber 13 can be arranged in almost triangular form. Also, as shown in FIG. 13 (*a*), in the grooves 123, the straight parts, which are closer to radius sides than the curved parts, whose side walls at the supports 122a, 122b and 122c sides retreat to the center sides. Therefore, in the vicinity of FGBs 15, that configuration can prevent the optical fiber 13 wound around the supports 122a, 122b and 122c from interfering with the side walls of the supports 122a, 122b and 122c sides. Incidentally, the optical fiber 13 is fixed to each of the supports 122a, 122b and 122c with fixing materials 14 in a state in which tension is applied to fiber parts between each of the supports 122a, 122b and 122c.

The island-shaped members 121a, 121b and 121c are connected by the connecting member 140 in a state in which predetermined intervals are provided between each of the island-shaped members 121a, 121b and 121c. The FBGs 15 in each of the fiber parts are set on the intervals. Screw holes 125 are formed at the arc sides of the straight parts of the grooves 123 in each island-shaped member 121a, 121b and 121c. Further, through holes are formed in positions corresponding to the screw holes 125 in the connecting member 140, thereby, as shown in FIG. 15, screws 142 are screwed in the screw holes 125 in each island-shaped member 121a, 121b and 121c through the through holes so that each of the island-shaped members 121a, 121b and 121c are connected to the connecting member 140. In this example, the connecting member 140 is made of a plate, however, concave portions or convex portions can be formed in order to match positions with the island-shaped members 122a, 122b and 122c on a surface of the connecting member on which the island-shaped members 122a, 122b and 122c are abutted.

In this example, each island-shaped member 121a, 121b and 121c is made of stainless steel, while, as shown in FIG. 13 (b), each island-shaped member 121a, 121b and 121c is provided with recessed parts 126 and 127 for spot welding. As shown in FIG. 13 (b) and FIG. 14, in each island-shaped member 121a, 121b and 121c, the recessed parts 126 and 127 are formed on the surface where the groove 123 is not formed. Also, the recessed parts 126 and 127 are aligned along a radius direction in the fan shape in planar view, while bottoms 131 and 132 of the recessed parts 126 and 127 constitute thin parts for the spot welding.

When the strain sensor 7 is fixed to the measuring object 100 by the spot welding, as shown in FIG. 14, in the strain sensor 7 a surface on which the optical fiber 13 is present is arranged so as to face the measuring object 100. Then, the thin parts of the bottoms 131 of the recessed parts 126 or the bottoms 132 of the recessed parts 127 are in contact with the measuring object 100 so that the thin parts and a surface of the measuring object 100 are spot welded. Also, as shown in FIG. 15, the connecting member 140 has an opening to uncover the recessed parts 126 and 127, thereby the spot welding is performed in a state in which each of the island-shaped members 121a, 121b and 121c is connected to the connecting member 140.

In this configuration, when strain in a limited portion is to be measured by enhancing measurement accuracy, the thin parts of the bottoms 131 in the recessed parts 126 formed in an inner part (a center side) are spot welded with the surface of the measuring object 100. While, when an averaged strain is to be measured, the thin parts of the bottoms 132 in the recessed parts 127 formed in an outer part (an arc side) are spot welded with the surface of the measuring object 100.

As shown in FIG. 13 (b) and FIG. 14, each island-shaped member 121a, 121b and 121c has recesses 128 at side of radiuses which are closer to the center than the groove 123 in the fan shape. When the strain sensor 7 is fixed to the measuring object 100, the recesses 128 function as places where an excessive adhesive escapes so as to restrain adjacent island-shaped members from connecting with adhesive each other.

Also, the connecting member 140 has notches 141 in a circumference which can be used for temporary fixation of the strain sensor 7 to the measuring object 100 before spot welding and fixation of the strain sensor 7 during adhesion with the adhesive.

After completion of the fixation of the strain sensor 7 to the measuring object 100, the screws 142 are removed and the connecting member 140 is released, thereby each of the island-shaped members 121a, 121b and 121c can be separated. In this way, even the strain sensor 7 in which the connecting member and the island-shaped members are connected by using coupling members as screws and the like, the same effect as the strain sensors 1 and 3 can be obtained.

The above described embodiments do not restrict the technical scope of the present invention, and even in other embodiments various modifications and applications within the scope of the present invention are possible. For example, in the above embodiment, the configuration to detect the strain by the variations of the wavelength of the reflected light in the FBGs 15 is described as the especially preferable embodiment, however, means for detecting the strain is not especially limited. A size of the sensor may be larger, but, for example, as the strain is detected by measuring the variations of the back scattering light of the optical fiber, a distribution type of detection of the strain can be employed.

In addition, in the above embodiment, as the especially preferable embodiment, the configuration in which the FBGs 15 having different wavelengths each other are arranged to detect the strain by WDM (wavelength division multiplexing) system is described, however, the present invention is applicable for a configuration in which the FBGs 15 having equal wavelength to detect the strain by TDM (time division multiplexing) system. In TDM system, intervals between adjacent FBGs should be more than a few meters, but this system is adaptable by increasing the number of turns of the optical fiber wound around the supports.

Further, the number and the positions of the supports, the number of the fiber parts directing to the different directions between the supports, or the arranging positions and the arranging directions of the fiber parts can be arbitrarily set within a range in which the rosette analysis can be performed.

Furthermore, in the above embodiment, when the strain sensor fix to the measuring object, the surface on which the optical fiber is arranged faces the measuring object. In the strain sensor, however, the surface on which the optical fiber is not arranged may face the measuring object. In this case, the configurations of the recessed parts 21 and the like may be changed appropriately.

INDUSTRIAL APPLICABILITY OF INVENTION

According to the present invention, the strain amount and the strain directions can be more accurately measured than the conventional art so that the present invention is useful as the strain sensor and the method for manufacturing the strain sensor.

EXPLANATION OF REFERENCE SIGNS 1 to 7 strain sensor
11, 16, 121 base 11a to 11c, 16a to 16c, 17a to 17c island-shaped member
18a to 18c, 20a to 20c, 121a to 121c island-shaped member
12, 12a to 12i, 18, 19a to 19c, 122a to 122c support
13 optical fiber
14 fixing material
13a to 13f fiber part
15, 15a to 15c FBG part
26, 27 connection (connection beam)
71 connecting member
72a to 72c spacer (connection part)
101 wound member arranging area
102 wound member
140 connecting member (connection part)

The invention claimed is:

1. A strain sensor comprising:
a base;
a plurality of supports provided in a state of protruding from the base and around which an optical fiber is wound;
one or a plurality of the optical fibers provided in a state of having parts directed to different directions each other between the supports as viewed from an opposite direction to the base; and
fixing materials to fix the optical fiber to the supports in a state in which tension is applied to the parts between the supports,
wherein the base comprises a plurality of island-shaped members on which each of the supports is provided respectively, and a connection to separably connect the island-shaped members.

2. The strain sensor according to claim 1, wherein the fixing materials fix the optical fiber by fixing parts of the optical fiber to the supports.

3. The strain sensor according to claim 1, wherein the supports are arranged in a state of rotational symmetry as viewed from the opposite direction to the base and the optical fiber is arranged in a state of passing adjacent to a point of symmetry.

4. The strain sensor according to claim 3, wherein the base comprises a plurality of island-shaped members on which each of the supports is provided respectively, and a connection to separably connect the island-shaped members.

5. The strain sensor according to claim 4, wherein the connection is constituted as a separated member from the island-shaped members and is provided with spacers to hold intervals between each of the island-shaped members at a predetermined interval.

6. The strain sensor according to claim 1, wherein the optical fiber is arranged in a state of enveloping outer edges of the supports as viewed from the opposite direction to the base.

7. The strain sensor according to claim 6, wherein the base comprises a plurality of island-shaped members on which each of the supports is provided respectively, and a connection to separably connect the island-shaped members.

8. The strain sensor according to claim 7, wherein the connection is constituted as a separated member from the island-shaped members and is provided with spacers to hold intervals between each of the island-shaped members at a predetermined interval.

9. The strain sensor according to claim 1, wherein, in the optical fiber, FBGs (fiber Bragg gratings) are provided in the parts directing to the different directions each other between the supports.

10. The strain sensor according to claim 1, wherein each of the plurality of supports has a part released after the optical fiber is fixed.

11. The strain sensor according to claim 1, wherein the connection is constituted as a separated member from the island-shaped members and is provided with spacers to hold intervals between each of the island-shaped members at a predetermined interval.

12. A strain sensor comprising:
a base;
a plurality of supports provided in a state of protruding from the base;
one or a plurality of optical fibers provided in a state of having parts directed to different directions each other between the supports as viewed from an opposite direction to the base;
fixing materials to fix the optical fiber to the supports in a state in which tension is applied to the parts between the supports; and
wound member arranging areas provided in adjacent positions to the supports, and wound members around which the optical fiber is wound being temporarily arranged in the wound member arranging areas when the tension is applied.

13. The strain sensor according to claim 12, wherein the supports are arranged in a state of rotational symmetry as viewed from the opposite direction to the base and the optical fiber is arranged in a state of passing adjacent to a point of symmetry.

14. The strain sensor according to claim 12, wherein the optical fiber is arranged in a state of enveloping outer edges of the supports as viewed from the opposite direction to the base.

15. The strain sensor according to claim 12, wherein, in the optical fiber, FBGs (fiber Bragg gratings) are provided in the parts directing to the different directions each other between the supports.

16. The strain sensor according to claim 12, wherein the base comprises a plurality of island-shaped members on which each of the supports is provided respectively, and a connection to separably connect the island-shaped members.

17. The strain sensor according to claim 16, wherein the connection is constituted as a separated member from the island-shaped members and is provided with spacers to hold intervals between each of the island-shaped members at a predetermined interval.

18. A method for manufacturing a strain sensor, comprising the steps of:
arranging wound members so as to be adjacent to each of a plurality of supports, the supports being provided in a state of protruding on a base;
winding an optical fiber around portions constituted of the wound members and the supports or the wound members, and arranging the optical fiber in a state of having parts directing to different directions each other between the supports as viewed from an opposite direction to the base;
fixing the optical fiber to the supports in a state in which tension is applied to the parts between the supports; and
releasing the wound members after the optical fiber is fixed to the supports.

* * * * *